Sept. 29, 1942.  R. S. BONE  2,296,976
ELECTRIC WEIGHING MACHINE
Filed July 30, 1940   4 Sheets-Sheet 4
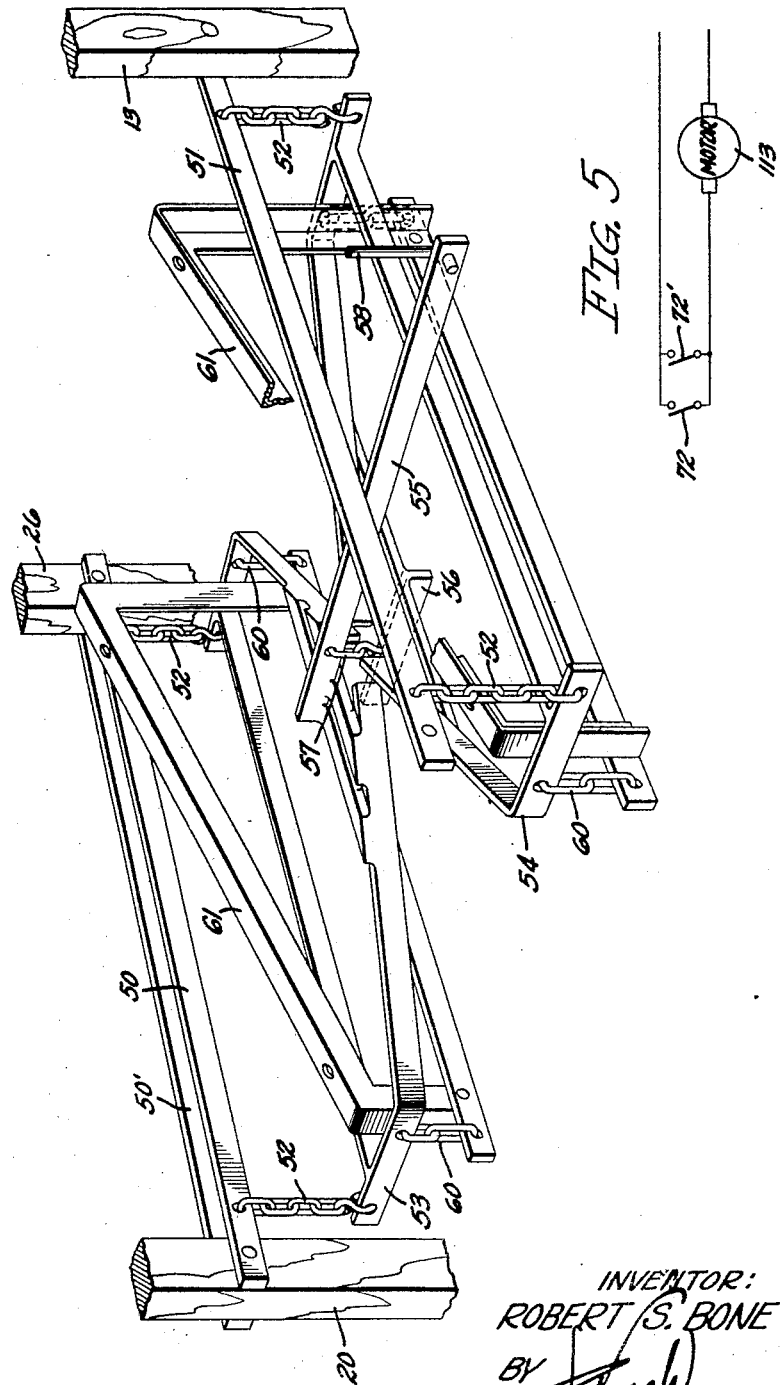
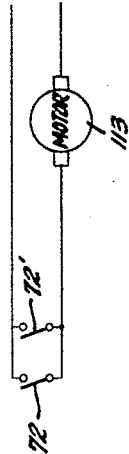
INVENTOR:
ROBERT S. BONE
BY
ATTORNEY Patented Sept. 29, 1942

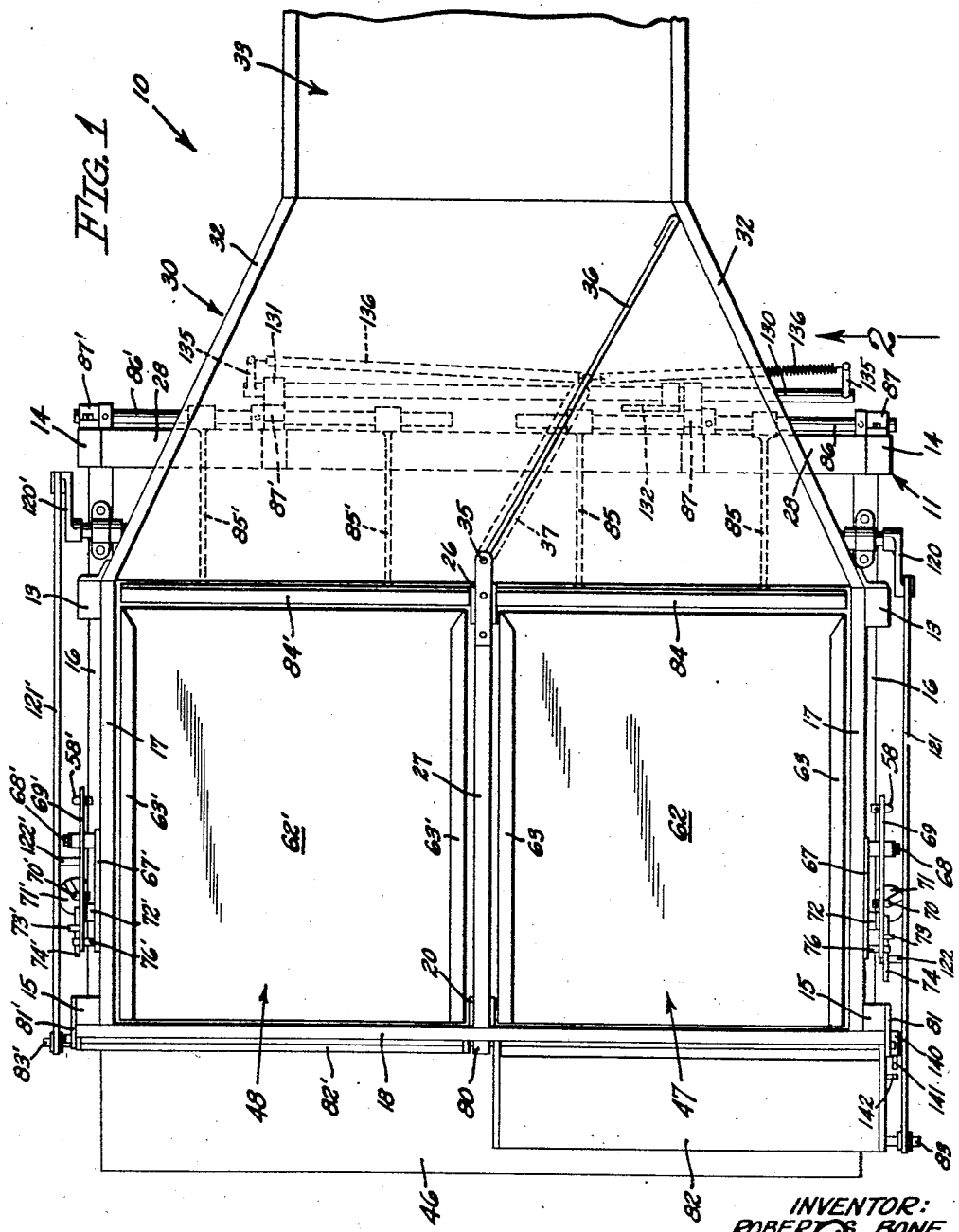

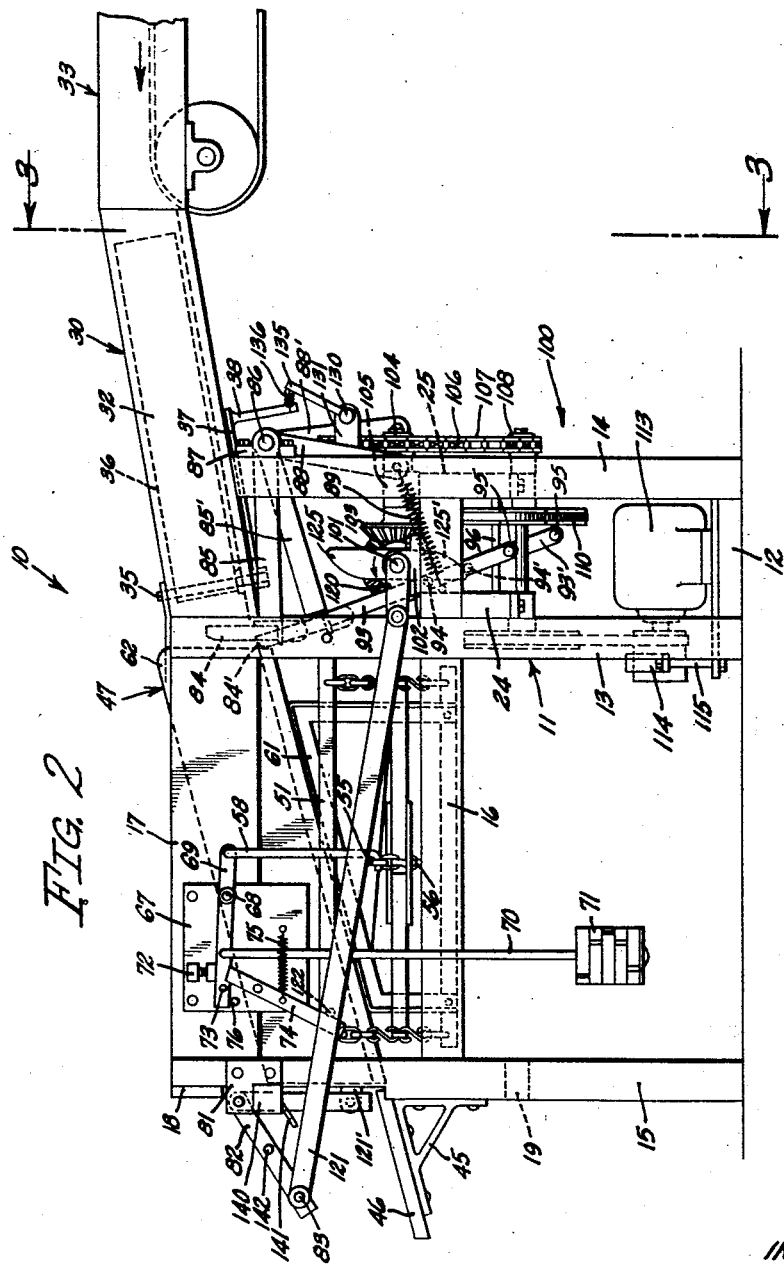

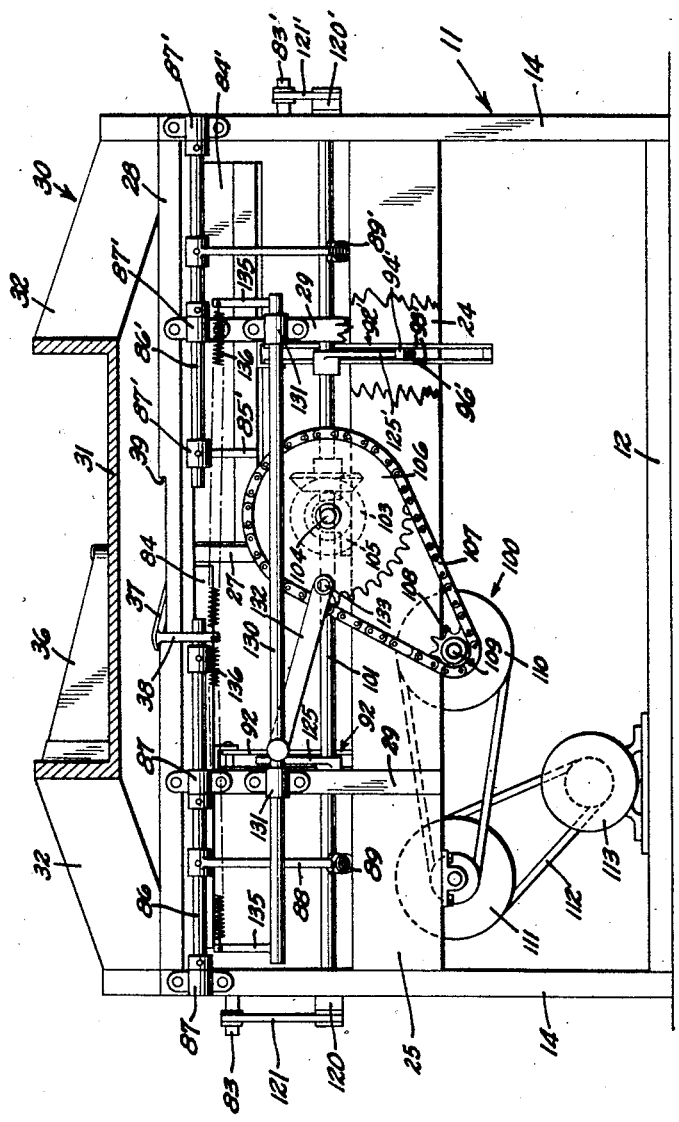

2,296,976

UNITED STATES PATENT OFFICE 2,296,976

ELECTRIC WEIGHING MACHINE

Robert S. Bone, San Benito, Tex., assignor to Food Machinery Corporation, San Jose, Calif., a corporation of Delaware Application July 30, 1940, Serial No. 348,499

1 Claim. (Cl. 249—27)

This invention relates to an automatic weighing machine for weighing loose material delivered thereto in a more or less continuous stream as from a conveyor. It is an object of this invention to provide a novel and improved weighing machine for this general purpose.

It is a further object of this invention to provide such a weighing machine which has a relatively high degree of accuracy.

The manner of accomplishing the foregoing objects as well as further objects and advantages will be made manifest in the following description taken in connection with the accompanying drawings, in which:

Fig. 1 is a plan view of a preferred embodiment of the weighing machine of the invention.

Fig. 2 is a side elevational view of Fig. 1.

Fig. 3 is a rear elevational sectional view taken on the line 3—3 of Fig. 2.

Fig. 4 is a diagrammatic perspective view of one of the weighing devices of the machine.

Fig. 5 is a wiring diagram for said machine.

Referring specifically to the drawings, the weighing machine 10 shown therein has a main frame 11 including a base 12 from which pairs of posts 13 and 14 extend upwardly. The frame also includes front corner posts 15, the posts 13, 14, and 15 being connected by side stringers 16, while the upper ends of posts 13 and 15 are connected by side boards 17. The posts 15 are connected at their upper ends by a plate 18 and at a point just below their centers by a frame member 19. The plate 18 and member 19 are connected at their centers by an upright member 20. (See Fig. 4.)

The posts 13 are connected by a transverse beam 24 and the posts 14 by a beam 25. Extending upwardly from the center of the beam 24 is a post 26 which at its upper end is connected by a board 27 with the middle of the plate 18 and the upper end of the upright 20. Also joining the upper ends of the posts 14 is a horizontal member 28. Connecting the beam 25 with the horizontal member 28 are uprights 29.

Supported on the horizontal member 28 is a delivery chute 30 for delivering material such as fresh fruit to the weighing machine 10. This chute has a floor 31 and side boards 32 and the weigher 10 is generally located so that the mouth of the chute 30 is disposed at the discharge end of a conveyor 33 which delivers fruit to the machine. Pivotally mounted in suitable bearings at the center of the discharge end of the chute 30 is a shaft 35 on which is fixed a diverting gate 36. The shaft 35 extends downwardly through the floor 31 and has an actuating arm 37 provided thereon which lies parallel with the gate 36 and has a downwardly extending finger 38. The arm 37 is free to swing within a recess 39 provided in the upper end of the member 28.

Mounted on brackets 45 supported on the corner posts 15 is a delivery board 46 over which fruit is delivered from the machine 10.

The machine 10 is provided with a pair of weighing mechanisms 47 and 48 which are identical in construction. A detailed description will therefore be given only of the mechanism 47 and reference thereafter to any parts of the weighing mechanism 48 will be made by employing the reference numerals applied to the corresponding parts of mechanism 47 with prime attached.

The mechanism 47 includes a frame bar 50 fixed at its opposite ends to the frame uprights 20 and 26, and a bar 51 attached at its opposite ends to frame posts 13 and 15. Suspended by chains 52 from these bars are yokes 53 and 54 having fixed thereto respectively a long arm 55 and a short arm 56 which lie in the same vertical plane and are connected together centrally of the mechanism by chain links 57. The arm 55 extends laterally to the side of the machine 10 where it pivotally connects to a rod 58 extending upwardly therefrom. Loosely suspended from the yokes 53 and 54 by chains 60 are inclined hopper base frames 61. An inclined hopper 62 having side walls 63 rigidly unites and is supported by the frames 61.

The mechanism 47 also includes a plate 67 mounted on the adjacent side board 17, this plate having a fulcrum pin 68 on which is pivotally mounted a weighing beam 69, one end of this beam loosely receiving the upper end of the rod 58. Suspended from the opposite end of the beam 69 is a weight carrying rod 70 which is adapted to receive a weight 71. Also provided on the plate 67 and beam 69 is a contact switch 72 which is closed by this beam when a sufficient amount of weight has been delivered to the hopper 62 to swing the beam 69 about its fulcrum 68 and lift the weight 71.

The beam 69 has a pin 73. Pivoted on the plate 67 is a latch 74. This latch is urged by a spring 75 into a position beneath the pin 73 so as to hold the switch 72 closed until this latch has been removed from this position. Provided on the plate 67 is a stop 76 for limiting the response of the latch 74 to the spring 75.

Pivotally mounted between a central bearing 80 mounted on the upright 20 and an outer bearing 81 provided on the adjacent corner post 15 is a door 82 having an actuating pin 83. This door is adapted, when in downward position, to retain material in the hopper 62 until this is weighed, and upon its being swung upwardly about its pivotal mounting releases this material and permits it to gravitate from the hopper 62 across the delivery board 46.

The weighing mechanism 47 also includes a rear door 84 supported on arms 85 which are fixed on a shaft 86, the latter being journalled in suitable bearings 87 mounted on the adjacent post 14, upright 29, and cross member 28. This shaft has a downwardly extending arm 88 which is connected by a spring 89 to the beam 24 to constantly urge the rear door 84 into an upper position in which it is shown in Fig. 2 and in which it is adapted to interrupt the delivery into the hopper 62 of any material gravitating downwardly over the delivery chute 30. This door is provided with a cam responsive link 92 formed of spaced pieces of strap material 93 between which is mounted a cam following roller 94 and a limit stop 95. Lying between the straps 93 is a fixed rod 96 which guides the link 92 under operating conditions to be described hereinafter.

The machine 10 also includes an electro-responsive operating mechanism 100. This includes a shaft 101 which is journalled in bearings 102 mounted on the side stringers 16 and which is adapted to be rotated through miter gears 103 and a shaft 104 journalled in a bearing 105 mounted on the beam 25. The shaft 104 is provided with a large sprocket wheel 106 which is driven through a chain 107 by a smaller sprocket 108 mounted on a counter shaft 109. This counter shaft is driven through a pulley 110 and counter pulleys 111 and belting 112 by an electric motor 113, the latter being mounted on the base 12. (See Figs. 2 and 3.) The motor 113 also has a brake 114 which is held under constant adjustable tension by a screw 115 so as to stop the motor 113 relatively quickly after it has been de-energized.

Fixed on the outer ends of the shaft 101 and extending in opposite directions therefrom, is a pair of arms 120 and 120' which are connected respectively by links 121 and 121' with front door actuating pins 83 and 83' of the weight mechanisms 47 and 48. The links 121 and 121' control the opening and closing of the front doors 82 and 82' of the respective weighing mechanisms 47 and 48 so that when either of these arms extends rearwardly from the shaft 101 the front door connected thereto is closed and when this arm extends forwardly from this shaft this front door is open. As shown in Fig. 1, the doors 82 and 82' open and close alternately. That is, when one is closed the other is open, and vice versa.

The links 121 and 121' carry pins 122 and 122' respectively. These links operate in a similar manner on the weighing mechanisms adjacent thereto respectively. This is illustrated in Fig. 2 where it is seen that when link 121 is extended forwardly so as to open the front door 82 the pin 122 provided on this link engages the latch 74 and shifts this out of latching position relatively to the pin 73 on the weighing beam 69, thus permitting the weight 71 to depress this beam and break contact in the switch 72.

The shaft 101 likewise has fixed thereon two rear door operating cams 125 and 125'. In Fig. 2, the first of these is shown as extending upwardly from the shaft 101 and the second of these cams is shown as extending downwardly from the shaft, these cams being mounted to point in opposite directions from the shaft 101. These cams are aligned respectively with the cam following rollers 94 and 94' of the links 92 and 92' so that as the shaft 101 rotates these cams engage these rollers and alternately depress the rear doors 84 and 84' from the position in which the door 84 is shown in broken lines in Fig. 2 to the position in which the door 84' is shown in broken lines in Fig. 2.

The operating mechanism 100 also includes a horizontal shaft 130 which is slidably journalled in bearings 131 provided on uprights 29 and which is adapted to be shifted in these bearings by a pitman 132 pivotally connecting this shaft to a pin 133 on the large sprocket 106. The shaft 130 has upwardly extending fingers 135 which are connected by contractile springs 136 with the finger 38 of the actuating arm 37.

The machine 10 has a counting device 140 mounted on the bearing 81 with an arm 141 which is engaged by a pin 142 on the door 82 so as to count the number of weighing operations performed by the machine.

*Operation*

The machine 10 is normally adapted to take care of a flow of fruit delivered more or less continuously from the conveyor 33. The operating parts of the machine 10 have two positions, and these parts remain disposed in one of these positions while the mechanism 47 is engaged in weighing material delivered to the machine by the conveyor 33, and they remain in the other of these positions while the mechanism 48 is so engaged in weighing material. In Fig. 1 they are shown disposed in the latter position, in which it is seen that the gate 36 is disposed so as to deflect material delivered to the chute 30 across the depressed rear door 84' into the hopper 62'. It is to be noted at this time that the front door 82' of the weighing mechanism 48 is in lower or closed position, thus the material delivered to the hopper 62' collects therein until the weight of this is sufficient to over-balance the weight 71', rock the balance beam 69', and close the switch 72'. For an understanding of the operation here being described of the mechanism 48, reference is had to Fig. 2 where the elements of the mechanism 47 are indicated by the same numerals as corresponding elements of the mechanism 48, but without the prime attached.

When the weight 71' is thus lifted, so as to close the switch 72', the latch 74' swings in beneath the pin 73' and temporarily holds the switch 72' closed. Closing this switch energizes the motor 113 and causes this to rotate the sprocket wheel 106 and the shaft 101, the latter rotating in the direction of the arrow in Fig. 2. The first few degrees of rotation of this shaft frees the roller 94' from the cam 125' and permits the spring 89' (see Fig. 3) to snap the rear door 84' from the lowermost position in which it is shown in broken lines in Fig. 2 to its uppermost position in which it intercepts and prevents the delivery to the hopper 62' of any of the pieces of fruit gravitating downwardly in the chute 30. Continued rotation of the shaft 101 causes the arm 120' and the link 121' to open the front door 82' of the weighing mechanism 48, thus permitting the material just weighed in the mechanism 48 to gravitate from the hopper 62' out of the machine across the delivery board 46. As soon as the hopper 62' is relieved of the weight of this material, the weight 71' over-balances this hopper and tends to drop downwardly and break the switch 72' through which current is flowing to energize the motor 113. This is prevented by the latch 74', however, until the pin 122' on the link 121' engages this latch and swings it in the same manner as shown in Fig. 2 to permit the weight 71' to drop and break the switch 72'. The location of the pin 122' is such that when the switch 72' is so broken and the motor 113 is caused to stop by the friction of the brake 114, the front door 82' is in fully open position.

The response of the motor 113 to the reception by the weighing mechanism 48 of a full load of material being weighed is thus seen to cause the shaft 101 to rotate 180 degrees. This not only has the results aforementioned upon the weighing mechanism 48, but has opposite results on the weighing mechanism 47. That is, it closes the door 82 and depresses the rear door 84 by the action of the cam 125 against the cam following roller 94. At the same time the shaft 101 is rotating 180 degrees, the sprocket 106 is rotating the same amount. The connection of this sprocket through the link 132 to the shaft 130 thus shifts this shaft to the right from the position in which it is shown in Fig. 3. This operates through the springs 136 and the arm 37 to swing the diverting gate 36 to the opposite side of the chute 30 so as to divert the material delivered to the chute thereafter to the hopper 62 of the weighing mechanism 47.

From this point, the operation of the machine 10 continues in exactly the same manner as just described except that the weighing takes place in the mechanism 47 and the energizing of the motor to effect the next change in position of the parts of the machine is effected by closing of the switch 72 resulting from the reception in the hopper 62 of a full load of material.

At the conclusion of the resulting operation, the parts of the machine 10 are as shown in Figs. 1 and 2. A full cycle of the machine has now been performed and a quantity of material weighed by and delivered from the machine 10 equivalent in weight to the weights 71 and 71'.

The total amount of fruit or other material weighed by the machine 10 over a given period of time is obtainable by multiplying the number of cycles registered by the counter 140 by the amount of the weights 71 and 71'.

I claim:

In an automatic fruit weighing machine, the combination of: duplicate weighing hoppers each hopper including an inclined floor and scale mechanism supporting said floor for weighing fruit resting on said floor; side walls for preventing the flow of fruit laterally from said floors; discharge control gates, each of which is shiftably mounted between open and closed positions opposite the lower edge of one of said floors; inlet fruit intercepting doors, one of which is disposed along the upper edge of of each of said floors and shiftable between open and closed positions; means forming a fruit runway along which fruit is adapted to be delivered to either of said hoppers across the upper edge of its floors; a shear board pivotally mounted for swinging movement across said runway between two positions, in one of which fruit is sheared into one of said hoppers and in the other of which positions fruit is sheared into the other of said hoppers; and means responsive to the weighing mechanism of either of said hoppers, when said hopper has received a given weight of fruit, to rapidly shift the inlet fruit intercepting door of said hopper into closed position, shift the discharge gate of said hopper into open position, shift the discharge gate of said other hopper to closed position, retract the inlet fruit intercepting door of said other hopper into open position, and swing said shear board to a position which causes fruit traveling along said runway to be deflected to said other hopper.

ROBERT S. BONE.